US009469318B2

(12) United States Patent
Kanner et al.

(10) Patent No.: US 9,469,318 B2
(45) Date of Patent: Oct. 18, 2016

(54) DYNAMIC WHEEL DIAMETER DETERMINATION SYSTEM AND METHOD

(71) Applicant: Thales Canada Inc, Toronto, Ontario (CA)

(72) Inventors: Abe Kanner, Mississauga (CA); Walter Kinio, Mississauga (CA); Ernest Sue, Whitby (CA)

(73) Assignee: Thales Canada Inc, Toronto, Ontario (CA)

( * ) Notice: Subject to any disclaimer, the term of this patent is extended or adjusted under 35 U.S.C. 154(b) by 0 days.

(21) Appl. No.: 14/077,725

(22) Filed: Nov. 12, 2013

(65) Prior Publication Data

US 2015/0134155 A1    May 14, 2015

(51) Int. Cl.
*G01B 21/12* (2006.01)
*B61L 15/00* (2006.01)
*G01B 7/12* (2006.01)
*B61L 25/02* (2006.01)
*G07C 5/02* (2006.01)

(52) U.S. Cl.
CPC ........ *B61L 15/0072* (2013.01); *B61L 15/0081* (2013.01); *B61L 25/023* (2013.01); *B61L 25/026* (2013.01); *G01B 7/125* (2013.01); *G07C 5/02* (2013.01)

(58) Field of Classification Search
None
See application file for complete search history.

(56) References Cited

U.S. PATENT DOCUMENTS

| 4,155,526 | A | | 5/1979 | Noble | |
|---|---|---|---|---|---|
| 4,301,899 | A | * | 11/1981 | McSparran | B61L 1/12 104/298 |
| 4,432,229 | A | * | 2/1984 | Nowogrodzki | G01P 3/56 73/146 |
| 4,524,932 | A | * | 6/1985 | Bodziak | B61L 1/165 246/247 |
| 4,798,963 | A | | 1/1989 | Wittkopp et al. | |
| 4,819,168 | A | | 4/1989 | Laskey | |
| 5,395,078 | A | * | 3/1995 | Gellender | B61L 1/08 246/249 |
| 5,803,411 | A | | 9/1998 | Ackerman et al. | |
| 5,947,423 | A | * | 9/1999 | Clifton | B61L 3/225 246/167 R |
| 6,371,417 | B1 | * | 4/2002 | Southon | B61L 1/165 246/247 |
| 6,663,053 | B1 | * | 12/2003 | Shams | B61L 5/107 246/122 R |
| 6,701,228 | B2 | | 3/2004 | Kane et al. | |
| 7,593,795 | B2 | | 9/2009 | Kane et al. | |
| 7,717,004 | B2 | * | 5/2010 | Kumar | H03M 7/30 73/866.5 |

(Continued)

FOREIGN PATENT DOCUMENTS

CN    102060037    5/2011
EP    0364088 A2 *    8/1989    .............. G01P 21/02

(Continued)

OTHER PUBLICATIONS

International Search Report for corresponding International Application No. PCT/IB2014/063441, dated Oct. 17, 2014.

*Primary Examiner* — Truc M Do
*Assistant Examiner* — Jess Whittington
(74) *Attorney, Agent, or Firm* — Hauptman Ham, LLP

(57) ABSTRACT

A system and method provide the capability to dynamically measure the diameter of a train wheel. An onboard sensor signals detection and loss of detection of a proximity plate having a predetermined length and placed along a direction of travel of the train. A signal generator generates a signal indicating the number of revolutions of the wheel. Based on the sensor signals indicating detection and loss of detection of the proximity plate, the length of the proximity plate, and the corresponding number of wheel revolutions, a controller automatically calculates the wheel diameter.

21 Claims, 4 Drawing Sheets

(56) References Cited

U.S. PATENT DOCUMENTS

2006/0061353 A1\* 3/2006 Etherington ........... G01D 5/145
　　　　　　　　　　　　　　　　　　　324/207.2
2013/0158894 A1 6/2013 Lee et al.

FOREIGN PATENT DOCUMENTS

| EP | 0364088 | 4/1990 |
| WO | 2013092956 | 6/2013 |

\* cited by examiner

DYNAMIC WHEEL DIAMETER DETERMINATION SYSTEM AND METHOD

BACKGROUND

For communication-based train control (CBTC) operation, accurate train position is required to facilitate both automatic and manual moving block operation. In addition, in order to stop a train accurately at stations, with or without platform doors, the precise position of the train is used. Positional precision is also beneficial when parking trains in close proximity in storage and pocket tracks.

To determine position and distance traveled, wheel revolutions are monitored, with distance calculated based on a number of revolutions and wheel diameter. To obtain accurate distance calculations, accurate determination of train wheel diameter is therefore fundamental. It is also desirable to be able to make such determinations dynamically, so that train operation is not slowed or interrupted for wheel diameter measurements.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
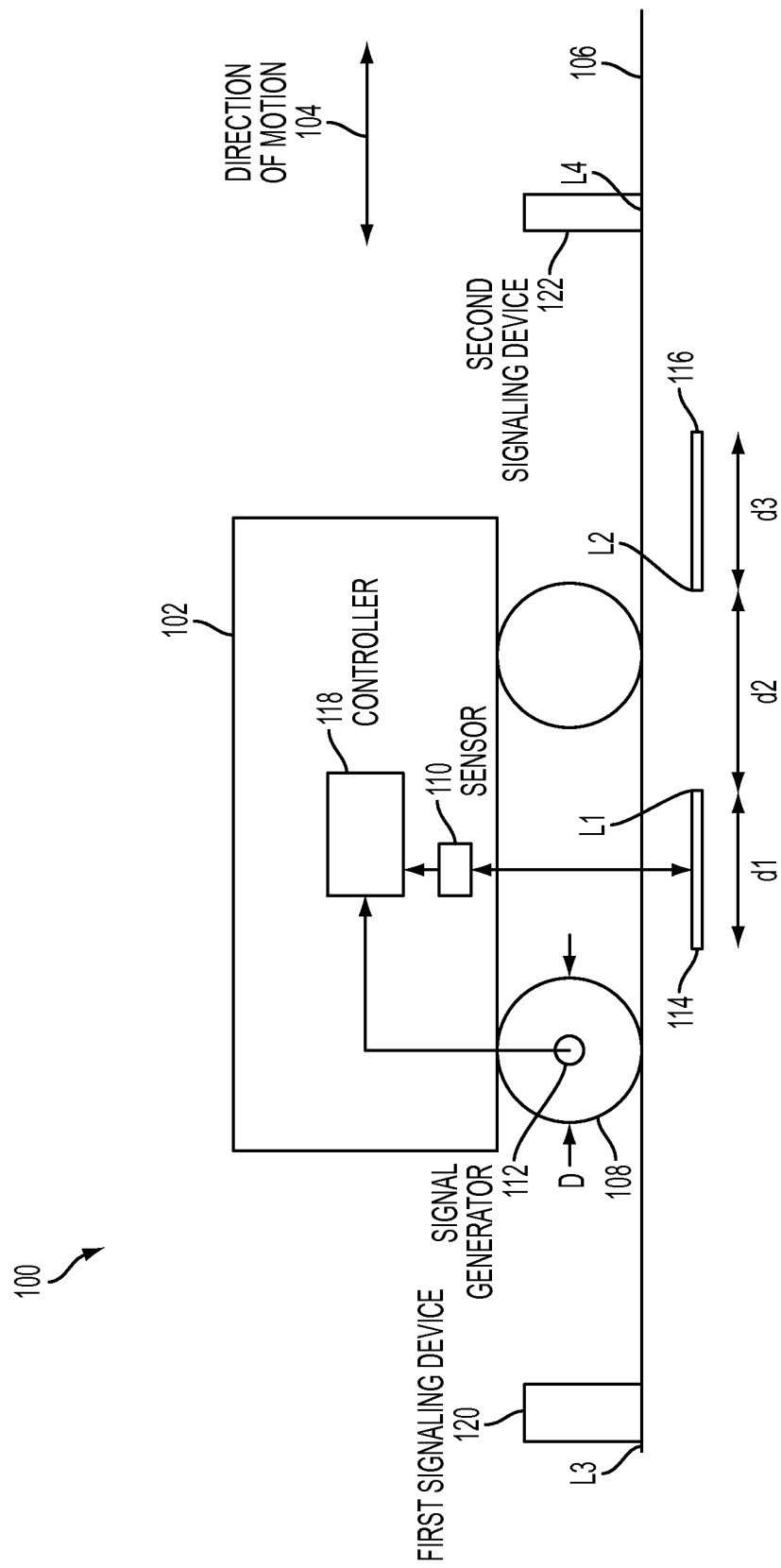
FIG. 1 is a schematic diagram of a system for dynamic wheel diameter determination according to one or more embodiments.

FIG. 1 is a diagram of a system 100 for dynamic wheel diameter determination in accordance with one or more embodiments. System 100 comprises a vehicle 102 moving along a direction of motion 104. In some embodiments, vehicle 102 moves along a guideway 106. Vehicle 102 comprises at least one wheel 108 having a diameter D, at least one sensor 110, and at least one signal generator 112.

System 100 further comprises a first proximity plate 114 and a second proximity plate 116 arranged along direction of motion 104. First proximity plate 114 has a first length d1 and is positioned at a first location L1 along direction of motion 104. First length d1 extends longitudinally along direction of motion 104. First proximity plate 114 and second proximity plate 116 are separated by a second length d2 along direction of motion 104.

Second proximity plate 116 has a third length d3 and is positioned at a second location L2 along direction of motion 104. Third length d3 extends longitudinally along direction of motion 104. Each of first length d1, second length d2, and third length d3 extend longitudinally end-to-end along direction of motion 104. First length d1, second length d2, and third length d3 are predetermined values.

In at least some embodiments, system 100 comprises only first proximity plate 114 and lacks second proximity plate 116. In other embodiments, system 100 comprises first proximity plate 114, second proximity plate 116, and at least one additional proximity plate.

Accuracy is increased with increasing numbers of proximity plates; however, cost and space requirements increase also. The use of two proximity plates instead of one allows for significant accuracy improvement while reducing cost and space burdens.

System 100 further comprises a controller 118. In some embodiments, controller 118 is located on-board vehicle 102. In other embodiments, controller 118 is located on-board another vehicle attached to vehicle 102. In some embodiments, controller 118 is located at a stationary position and not on-board a vehicle.

In some embodiments, system 100 further comprises a first signaling device 120 positioned at a location L3 along direction of motion 104. In some embodiments, system 100 includes a second signaling device 122 positioned at a location L4 along direction of motion 104.

In some embodiments, vehicle 102 is part of a train. In some embodiments, vehicle 102 is a train. In some embodiments, vehicle 102 is configured to carry passengers. In some embodiments, vehicle 102 is configured to carry freight. In some embodiments, vehicle 102 is capable of being remotely operated by a driver not present on the vehicle.

In some embodiments, vehicle 102 moves along guideway 106 and direction of motion 104 is bi-directional. In some embodiments, direction of motion 104 is any direction with respect to the ground or other path along which vehicle 102 moves.

Guideway 106 is configured to control a travel path of vehicle 102. In some embodiments, guideway 106 is a dual rail guideway including two rails spaced apart from one another. In some embodiments, guideway 106 is a monorail guideway including a single rail.

Wheel 108 is located on vehicle 102 and is configured to facilitate motion of vehicle 102 along at least one direction of motion 104. In various embodiments, vehicle 102 includes any number of other wheels in addition to wheel 108. In some embodiments, wheel 108 is identical to other wheels on vehicle 102. In some embodiments, wheel 108 is different from other wheels on vehicle 102. In at least some embodiments, each wheel on vehicle 102 has a same diameter D. In at least some embodiments, one or more wheels on vehicle 102 have differing diameters.

In some embodiments, wheel 108 is part of a wheel assembly attached to vehicle 102. In some embodiments, wheel 108 is attached to an axle within a wheel assembly. In some embodiments, wheel 108 is attached to an axle held directly by vehicle 102.

Wheel 108 has at least one outside diameter D such that the outer surface or circumference of the wheel is in contact with guideway 106. In some embodiments, wheel 108 is configured to control motion of vehicle 102 along guideway 106. In some embodiments, wheel 108 is configured to control motion of vehicle 102 along guideway 106 by having a flange. In some embodiments, diameter D is the largest diameter of wheel 108.

Wheel 108 is constructed of any material having sufficient strength to support vehicle 102 and facilitate motion of vehicle 102 along direction of motion 104. In some embodiments, the material is chosen from metal, rubber, plastic, or another suitable material or a combination thereof. In some embodiments, wheel 108 is or comprises stainless steel. In some embodiments, wheel 108 comprises an outer portion of rubber configured around an inner portion comprising metal.

Figure 2:
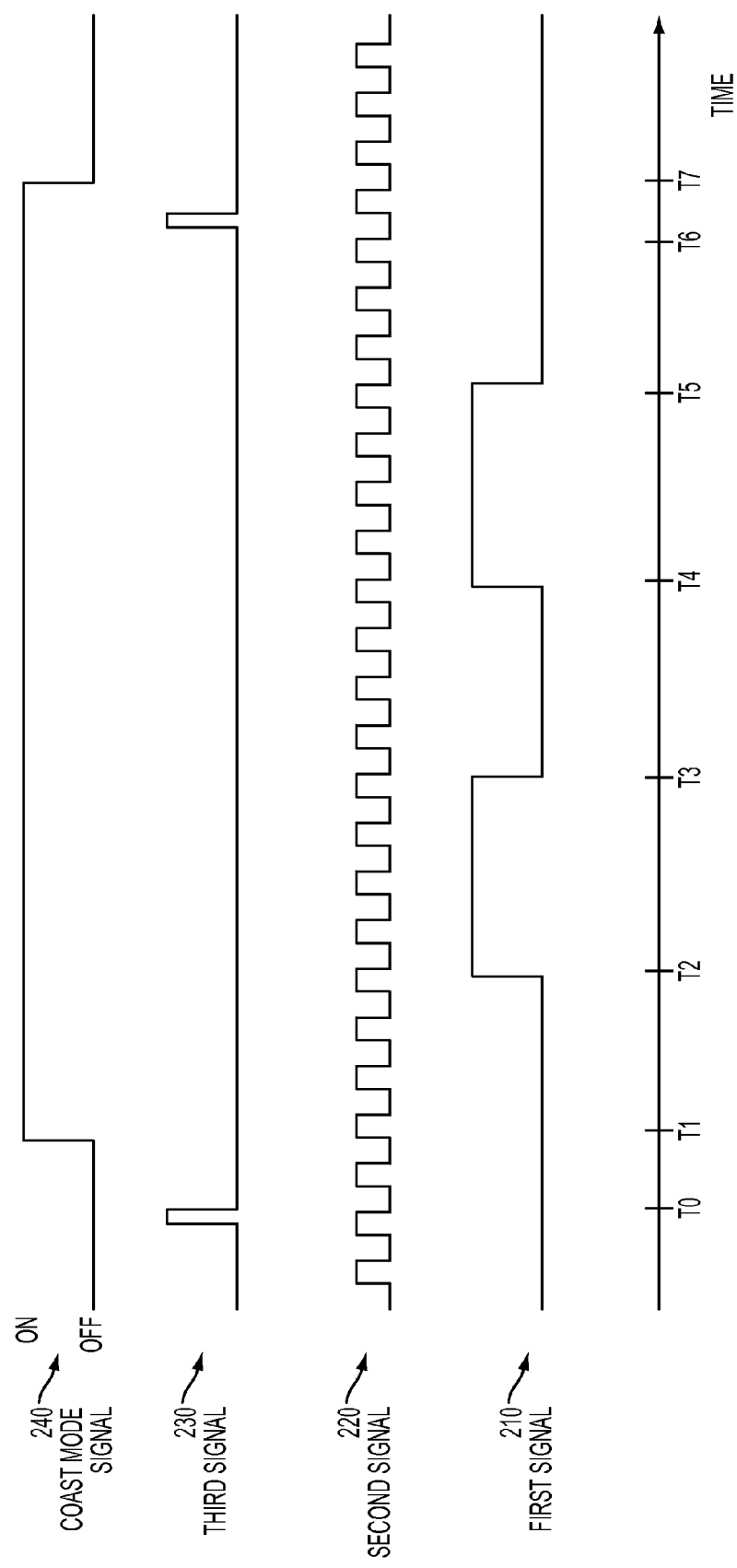
FIG. 2 is a graphical representation of signals indicating detection and loss of detection according to one or more embodiments.

Referring to FIG. 1 and FIG. 2, sensor 110 is mounted on vehicle 102 and is configured to detect first proximity plate 114 and second proximity plate 116. Sensor 110 is configured to generate a first signal 210 indicating detection and loss of detection of first proximity plate 114 and second proximity plate 116. In some embodiments, sensor 110 is a Hall Effect Sensor or another suitable type of magnetic metal detector. In various embodiments, vehicle 102 includes any number of other sensors in addition to sensor 110. In some embodiments, sensor 110 is identical to other sensors on vehicle 102. In some embodiments, sensor 110 is different from other sensors on vehicle 102.

Referring to FIG. 1 and FIG. 2, signal generator 112 is positioned on vehicle 102 and is configured to generate a second signal 220 including a pulse corresponding to at least a portion of a revolution of wheel 108. Signal generator 112 generates a predetermined number of pulses for each revolution of wheel 108. In some embodiments, signal generator 112 is a tacho-generator mounted on an axle attached to wheel 108. In some embodiments, signal generator 112 generates a predetermined number of pulses corresponding to a single revolution of wheel 108. In various embodiments, the number of pulses is less than, equal to, or greater than the number of wheel revolutions. In some embodiments, the number of pulses indicates a full and fractional number of wheel revolutions. In some embodiments, a signal other than a number of pulses indicates a number of revolutions of wheel 108.

In various embodiments, vehicle 102 includes any number of other signal generators in addition to signal generator 112. In some embodiments, signal generator 112 is identical to other signal generators on vehicle 102. In some embodiments, signal generator 112 differs from other signal generators on vehicle 102.

In some embodiments, a proximity plate, e.g., first or second proximity plate 114, is a metal plate configured to be detected by sensor 110 mounted on the vehicle 102. In some embodiments, the proximity plate includes a non-magnetic material such as aluminum. In some embodiments, the proximity plate includes a magnetic material, such as iron, unfinished steel or another suitable magnetic material.

In some embodiments, the proximity plate is located between rails of a split rail guideway. In some embodiments, the proximity plate is located adjacent to guideway 106 for monorail systems. In some embodiments, the proximity plate is located within guideway 106. In some embodiments, the proximity plate is located outside rails of a split rail guideway.

In some embodiments, the proximity plate has a length d1 ranging from about 1 meter to about 1.5 meters. In some embodiments, the proximity plate has a width ranging from about 30 centimeters (cm) to about 50 cm. In still further embodiments, the proximity plate has different dimensions suitable for detection by sensor 110 given a particular rate of travel of vehicle 102.

In some embodiments, first proximity plate 114 and second proximity plate 116 have approximately the same dimensions. In some embodiments, length d1 is substantially equal to length d3. In other embodiments, length d1 is substantially different from length d3. In some embodiments, other dimensions of first proximity plate 114 and second proximity plate 116 differ substantially.

First proximity plate 114 at location L1 and second proximity plate 116 at location L2 are separated by second length d2. In some embodiments, second length d2 has a value ranging from about 50 cm to about 2 meters. In still further embodiments, second length d2 is a different value suitable for detection by sensor 110 given a particular rate of travel of vehicle 102.

Controller 118 is capable of accessing predetermined values for first length d1, second length d2, and third length d3. In some embodiments, values for first length d1 and third length d3 are based on manufacturing specifications.

First signaling device 120 is positioned at location L3 along direction of motion 104. In some embodiments, first signaling device 120 is located adjacent to guideway 106. In some embodiments, first signaling device 120 is located between rails of a split rail guideway. In some embodiments, first signaling device 120 is located outside rails of a split rail guideway.

In some embodiments, in operation, movement of vehicle 102 in direction of motion 104 causes the vehicle to pass first signaling device 120 before passing first proximity plate 114 and second proximity plate 116. In some embodiments, first signaling device 120 is configured to initiate an on-board response as vehicle 102 passes first signaling device 120. In some embodiments, first signaling device 120 is configured to automatically initiate an on-board response. In some embodiments, first signaling device 120 is or comprises a transponder. In some embodiments, first signaling 120 device is or comprises an RFID transponder. In other embodiments, first signaling device is a proximity plate.

In some embodiments, first signaling device 120 is configured to cause an operator of vehicle 102 to manually initiate an on-board response. In some embodiments, first signaling device 120 is or comprises a sign.

In some embodiments, second signaling device 122 is positioned at location L4 along direction of motion 104. In some embodiments, second signaling device 122 is located adjacent to guideway 106. In some embodiments, second signaling device 122 is located between rails of a split rail guideway. In some embodiments, second signaling device 122 is located outside rails of a split rail guideway.

In some embodiments, in operation, movement of vehicle 102 in direction of motion 104 causes the vehicle to pass second signaling device 122 before passing first proximity plate 116 and second proximity plate 114. In some embodiments, second signaling device 122 is configured to initiate an on-board response as vehicle 102 passes second signaling device 122. In some embodiments, second signaling device 122 is configured to automatically initiate an on-board response. In some embodiments, second signaling device 122 is or comprises a transponder. In some embodiments, second signaling device 122 is or comprises an RFID transponder. In other embodiments, second signaling device is a proximity plate.

In some embodiments, second signaling device 122 is configured to cause an operator of vehicle 102 to manually initiate an on-board response. In some embodiments, second signaling device 122 is or comprises a sign.

In some embodiments, second signaling device 122 is identical to first signaling device 120. In other embodiments, first signaling device 120 differs from second signaling device 122.

Referring to FIG. 1 and FIG. 2, in some embodiments, in operation, an on-board response to first signaling device 120 or second signaling device 122 includes generation or modification of a third signal 230. In some embodiments, controller 118 is configured to receive third signal 230. In some embodiments, an on-board detecting device is configured to generate or modify third signal 230 in response to detecting first signaling device 120 or second signaling device 122. In some embodiments, an on-board detecting device is configured to detect an RFID transponder as first signaling device 120 or second signaling device 122. In some embodiments, an on-board detecting device is a sensor configured to detect a proximity plate. In some embodiments, an on-board detecting device is sensor 110.

In some embodiments, an on-board control assembly is configured to generate or modify third signal 230 in response to an input by a driver or operator of vehicle 102. In some embodiments, in operation, the driver or operator of vehicle 102 provides the input in response to detecting, e.g., visually or audibly, first signaling device 120 or second signaling device 122.

In some embodiments, direction of motion 104 of vehicle 102 is bi-directional. Accordingly, use of the terms "first" and "second" proximity plates and signaling devices is not limited to the relative positions depicted for system 100. In some embodiments, the term "first signaling device" designates either one of two signaling devices, "first" indicating that a vehicle passes a particular signaling device before another depending on the specific direction of motion. Similarly, in some embodiments, the term "first proximity plate" designates either one of two proximity plates, "first" indicating that a vehicle passes a particular proximity plate before another depending on the specific direction of motion.

Controller 118 is configured to receive first signal 210 from sensor 110, second signal 220 from signal generator 112, and determine diameter D based on detection and loss of detection of first proximity plate 114, first length d1, and the number of revolutions of wheel 108. In some embodiments, controller 118 is configured to determine diameter D based on detection and loss of detection of second proximity plate 116, second length d2, and third length d3, as well as detection and loss of detection of first proximity plate 114, first length d1, and the number of revolutions of wheel 108 based on the number of pulses in second signal 220 during the time interval in which the wheel traversed first length d1.

In some embodiments, controller 118 is configured to receive signals from at least one sensor in addition to sensor 110. In some embodiments, controller 118 is configured to receive signals from at least one signal generator in addition to signal generator 112. In some embodiments, controller 118 is configured to determine a diameter of at least one wheel in addition to wheel 108.

Referring to FIG. 1 and FIG. 2, in some embodiments, controller 118 is a vital on-board controller (VOBC). In some embodiments, controller 118 is connected to automatic speed control which is configured to adjust the speed of vehicle 102. In some embodiments, controller 118 is integrated with the automatic speed control so that controller 118 directly controls a thrust and braking of vehicle 102. In some embodiments, controller 118 is capable of generating coast mode signal 240 to place vehicle 102 in a coast mode in which no thrusting or braking is applied.

In various embodiments, vehicle 102 includes any number of other controllers in addition to controller 118. In some embodiments, controller 118 is identical to other controllers on vehicle 102. In some embodiments, controller 118 is different from other controllers on vehicle 102.

Referring to FIG. 2, first signal 210 indicates detection and loss of detection of first proximity plate 114 and second proximity plate 116, if present. In the example embodiment depicted in FIG. 2, first signal 210 indicates detection and loss of detection of a proximity plate as transitions between two values. In various embodiments, first signal 210 is any combination of signal and signal modification scheme capable of indicating detection and loss of detection of a proximity plate.

In the example embodiment depicted in FIG. 2, detection of first proximity plate 114 is indicated at time T2, loss of detection of first proximity plate 114 is indicated at time T3, detection of second proximity plate 116 is indicated at time T4, and loss of detection of second proximity plate 116 is indicated at time T5.

Second signal 220 indicates the number of revolutions of wheel 108. In the example embodiment depicted in FIG. 2, second signal 220 indicates the number of revolutions as a series of pulses in which a predetermined number of pulses corresponds to a single revolution of wheel 108. In various embodiments, second signal 220 is a combination of signal and signal modification scheme capable of indicating a full and/or fractional number of revolutions of a wheel.

In the example embodiment depicted in FIG. 2, second signal 220 is a series of uniform pulses corresponding to a constant rate of revolution of wheel 108. In various embodiments, second signal 220 includes a time-varying component corresponding to a variation in the rate of revolution of wheel 108.

Third signal 230 indicates the detection of first signaling device 120 and second signaling device 122, if present. In the example embodiment depicted in FIG. 2, third signal 230 indicates detections of signaling devices as transitions between two values. In various embodiments, third signal 230 is any combination of signal and signal modification scheme capable of indicating detection of a signaling device.

In the example embodiment depicted in FIG. 2, detection of first signaling device 120 is indicated at time T0 and detection of second signaling device 122 is indicated at time T6.

In some embodiments, third signal 230 is either not present or not used. In some embodiments in which third signal 230 is either not present or not used, first signaling device 120 is a proximity plate and detection of first signaling device 120 is indicated by first signal 210. In some embodiments in which third signal 230 is either not present or not used, first signaling device 120 is a sign and a driver or operator indicates detection of first signaling device 120 through a manual input.

Coast mode signal 240 indicates control of thrusting and braking of vehicle 102. Coast mode "on" indicates that no thrusting or braking is applied so that wheel 108 is rolling and not slipping or sliding. In the example embodiment depicted in FIG. 2, coast mode signal 240 indicates start and stop of coast mode as transitions between two values. In various embodiments, coast mode signal 240 is any combination of signal and signal modification scheme capable of indicating application of a coast mode.

In some embodiments, application of a coast mode is achieved manually by a driver or operator of vehicle 102 and coast mode signal 240 is either not present or not used.

Coast mode "off" indicates any control status of vehicle 102 other than the combination of no thrusting or braking of coast mode.

Controller 118 is configured to receive first signal 210, second signal 220, and third signal 230, if present. In some embodiments, controller 118 is configured to execute a first response upon receipt of an indication of detection of first signaling device 120 in third signal 230. In some embodiments, controller 118 is configured to execute the first response upon receipt of an indication of detection of first signaling device 120 in first signal 210. In some embodiments, the first response includes outputting a coast mode "on" indication in coast mode signal 240. In some embodiments, the first response includes monitoring first signal 210 for indications of detection and loss of detection of a proximity plate.

In some embodiments, controller 118 is configured to execute a second response upon receipt of an indication of detection of second signaling device 122 in third signal 230. In some embodiments, controller 118 is configured to execute the second response upon receipt of an indication of detection of second signaling device 122 in first signal 210. In various embodiments, controller 118 is configured to execute the second response upon receipt of an indication in first signal 210 of loss of detection of first proximity plate 114, second proximity plate 116, or another proximity plate. In some embodiments, controller 118 is configured to execute the second response upon receipt of an input other than first signal 210 or third signal 230.

In some embodiments, the second response includes outputting a coast mode "off" indication in coast mode signal 240. In some embodiments, the second response includes initiating a determination of wheel diameter D. In some embodiments, initiating a determination of wheel diameter D includes invoking a software algorithm.

Controller 118 is configured to determine diameter D of wheel 108 based on at least first length d1, detection and loss of detection of first proximity plate 114, and the number of revolutions of wheel 108 based on the number of pulses in second signal 220 during the traversal of first length d1 by the wheel.

For a given interval of time, the number of revolutions, NRV, of wheel 108 is obtained from the number of pulses in second signal 220 during the particular time interval. In the embodiment depicted in FIG. 2, the number of revolutions is given by:

$$NRV = (\text{number of pulses in interval})/(\text{number of pulses per revolution})$$

In other embodiments, NRV is determined by any method consistent with the method used to indicate number of revolutions in second signal 220. Diameter D is therefore given by:

$$D = (\text{distance traveled in interval})/(\pi * NRV)$$

In the embodiment depicted in FIG. 2, times T2 and T3 define the interval for detection and loss of detection of first proximity plate 114. For this interval, the distance traveled is the known value of first length d1. Diameter D in this case is calculated as:

$$D = d1/(\pi * NRV \text{ from } T2 \text{ to } T3)$$

In some embodiments this calculation is used to determine diameter D of wheel 108.

In some embodiments, additional calculations are made for additional time intervals as defined by times T2, T3, T4, and T5. The following time intervals and corresponding distances apply:

T2 to T3: d1
T3 to T4: d2
T4 to T5: d3
T2 to T5: d1+d2+d3
T2 to T4: d1+d2
T3 to T5: d2+d3

Because d1, d2, and d3 have known values, calculation of distance traveled for each of the six combinations is straightforward, and diameter D is capable of being determined based on the number of revolutions of wheel 108 over the corresponding time interval.

In some embodiments, controller 118 is configured to determine diameter D by averaging at least two diameter calculations based on different time intervals. In some embodiments, controller 118 is configured to determine diameter D by averaging six diameter calculations based on six different time intervals. Averaging six calculations improves accuracy by canceling out delays in detection and loss of detection of proximity plates.

In a particular embodiment in which six calculations are averaged, individual calculations Dx are given by:

$$D1 = d1/(\pi * NRV \text{ from } T2 \text{ to } T3)$$

$$D2 = d2/(\pi * NRV \text{ from } T3 \text{ to } T4)$$

$$D3 = d3/(\pi * NRV \text{ from } T4 \text{ to } T5)$$

$$D4 = d1+d2+d3/(\pi * NRV \text{ from } T2 \text{ to } T5)$$

$$D5 = d1+d2/(\pi * NRV \text{ from } T2 \text{ to } T4)$$

$$D6 = d2+d3/(\pi * NRV \text{ from } T3 \text{ to } T5)$$

Diameter D is then determined from the individual calculations:

$$D = (D1+D2+D3+D4+D5+D6)/6$$

By averaging over multiple intervals defined by different combinations of detection and loss of detection of proximity plates, measurement error is reduced. Proximity plate detection involves sensor activation while loss of detection involves sensor de-activation. The use of multiple readings with different activation and de-activation operating domains is used to eliminate the sensor errors corresponding to each operating domain.

Figure 3:
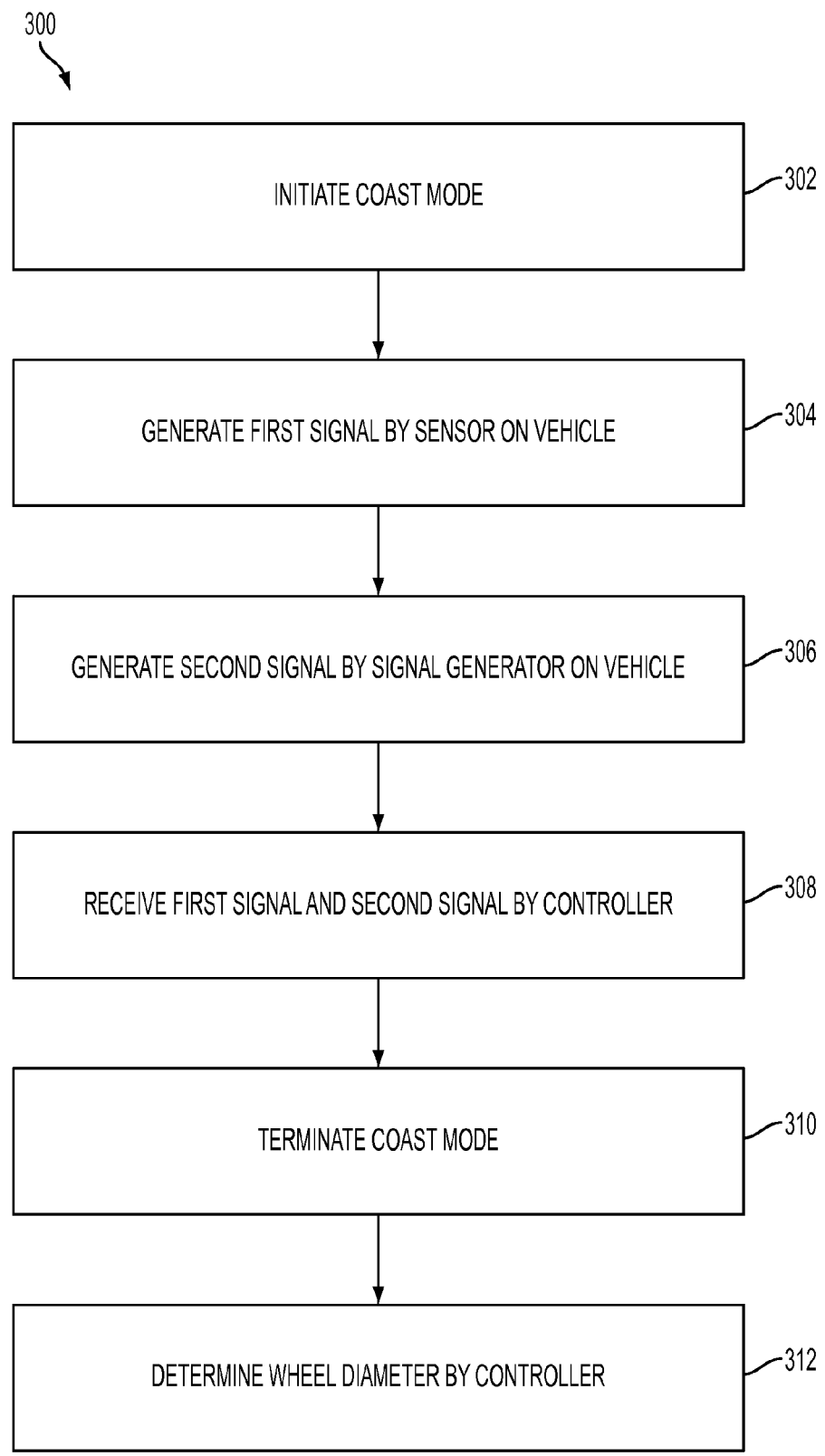
FIG. 3 is a flow chart for a method of dynamic wheel diameter determination according to one or more embodiments.

The present description also concerns a method of dynamic wheel diameter determination. An example embodiment of a method 300 of dynamic wheel diameter determination is depicted in FIG. 3. Various embodiments include some or all of the steps depicted in FIG. 3.

In step 302, a coast mode is initiated for a vehicle. In coast mode, no thrusting or braking is applied so that a wheel of the vehicle is rolling and not slipping or sliding. Coast mode is initiated by detection of a first signaling device. In some embodiments, coast mode is initiated automatically through automatic detection of the first signaling device. In some embodiments, coast mode is initiated manually by a driver or operator of the vehicle upon detection of the first signaling device.

In step 304, a sensor on the vehicle generates a first signal. The first signal indicates detection and loss of detection of a first proximity plate having a first length and positioned at a first location along a direction of motion of the vehicle. In some embodiments, the first signal indicates detection and loss of detection of a second proximity plate having a second length, positioned at a second location along the direction of motion of the vehicle. A known third length separates the first location and second location.

In some embodiments, the first signaling device is a proximity plate and the first signal indicates detection of the first signaling device. In some embodiments, the second signaling device is a proximity plate and the first signal indicates detection of a second signaling device.

In some embodiments, the sensor continuously generates the first signal. In other embodiments, the sensor generates the first signal in response to detection of at least one of the first proximity plate, second proximity plate, first signaling device, and second signaling device.

In step 306, a signal generator on the vehicle generates a second signal. The second signal indicates a number of revolutions of a wheel on the vehicle. In some embodiments, the signal generator is a tacho-generator. In some embodiments, the second signal indicates the number of revolutions of the wheel through a series of pulses, a predetermined number of pulses corresponding to a single revolution of the wheel.

In some embodiments, the signal generator sensor continuously generates the second signal. In other embodiments, the signal generator generates the second signal in response to an input.

In step 308, a controller receives the first signal and second signal. In some embodiments, the controller receives the first signal through a direct path on-board the vehicle. In some embodiments, the controller receives the second signal through a direct path on-board the vehicle. In some embodiments, the controller receives one or both of the first signal and the second signal over a wireless connection.

In some embodiments, the controller continuously receives one or both of the first signal and the second signal. In some embodiments, the controller receives one or both of the first signal and the second signal in response to an input.

In step 310, vehicle coast mode is terminated. In some embodiments, coast mode is terminated automatically through automatic detection of a second signaling device. In some embodiments, coast mode is terminated manually by the driver or operator of the vehicle.

In step 312, a diameter of the wheel is determined by the controller. Determining the diameter is based on the first length, the detection and loss of detection of the first proximity plate, and the number of revolutions of the wheel. In some embodiments, determining the diameter is also based on the second length, the third length, and detection and loss of detection of the second proximity plate. In some embodiments, determining the diameter includes averaging at least two separate diameter calculations based on detection and loss of detection events and the number of revolutions of the wheel. In some embodiments, determining the diameter includes averaging six separate diameter calculations based on detection and loss of detection events and the number of revolutions of the wheel.

In some embodiments, determining the diameter is initiated by detection of the second signaling device. In some embodiments, determining the diameter is initiated by the loss of detection of the first or second proximity plate.

Figure 4:
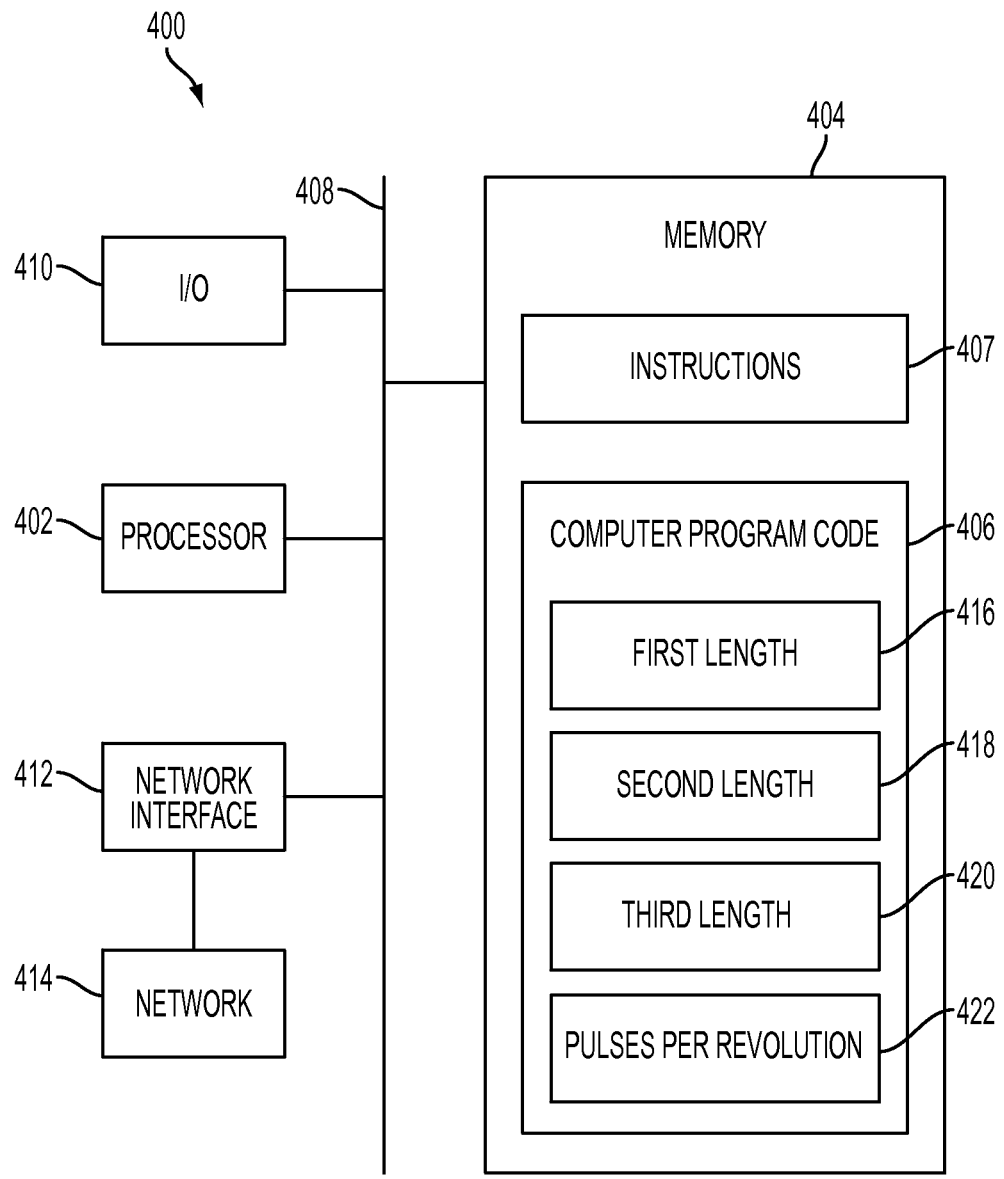
FIG. 4 is a block diagram of a controller usable in accordance with one or more embodiments.

FIG. 4 is a block diagram of a controller 400 configured for dynamic wheel diameter determination in accordance with one or more embodiments. In some embodiments, controller 400 is an on-board controller for a vehicle. In some embodiments, controller 400 is similar to controller 118 (FIG. 1). Controller 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with elements of VOBC 400. The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting and communicating to external elements via network 414. In some embodiments, network interface 412 is replaced with a different communication path such as optical communication, microwave communication, inductive loop communication, or other suitable communication paths. The processor 402 is configured to execute the computer program code 406 encoded in the computer readable storage medium 404 in order to cause controller 400 to be usable for performing a portion or all of the operations as described with respect to dynamic wheel diameter determination system 100 (FIG. 1) or a method 300 (FIG. 3).

In some embodiments, the processor 402 is a central processing unit (CPU), a multi-processor, a distributed processing system, an application specific integrated circuit (ASIC), and/or a suitable processing unit. In some embodiments, processor 402 is configured to receive detection and loss of detection information signals and number of wheel revolutions information signals via network interface 412. In some embodiments, processor 402 is configured to generate vehicle control information signals for transmitting to external circuitry via network interface 412.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD). In some embodiments, the computer readable storage medium 404 is part of an embedded microcontroller or a system on chip (SoC).

In some embodiments, the storage medium 404 stores the computer program code 406 configured to cause controller 400 to perform the operations as described with respect to dynamic wheel diameter determination system 100 (FIG. 1) or method 300 (FIG. 3). In some embodiments, the storage medium 404 also stores information needed for performing the operations as described with respect to dynamic wheel diameter determination system 100, such as a first length parameter 416, a second length parameter 418, a third length parameter 420, a pulses per revolution parameter 422, and/or a set of executable instructions to perform the operation as described with respect to dynamic wheel diameter determination system 100.

In some embodiments, the storage medium 404 stores instructions 407 for interfacing with external components. The instructions 407 enable processor 402 to generate operating instructions readable by the external components to effectively implement the operations as described with respect to dynamic wheel diameter determination system 100.

Controller 400 includes I/O interface 410. I/O interface 410 is coupled to external circuitry. In some embodiments, I/O interface 410 is configured to receive instructions from a port in an embedded controller.

Controller 400 also includes network interface 412 coupled to the processor 402. Network interface 412 allows Controller 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, IEEE-1394, or asynchronous or synchronous communications links, such as RS485, CAN or HDLC. In some embodiments, the operations as described with respect to Controller 400 are implemented in two or more wheel diameter determining systems, and information such as first length, second length, third length, and number of revolutions are exchanged between different Controller 400 via network 414.

Controller 400 is configured to receive information related to a first length from a user or an external circuit. The information is transferred to processor 402 via bus 408 and stored in computer readable medium 404 as first length parameter 416. Controller 400 is configured to receive information related to a second length from a user or an external circuit. The information is transferred to processor 402 via bus 408 and stored in computer readable medium 404 as second length parameter 418. Controller 400 is configured to receive information related to a third length from a user or an external circuit. The information is transferred to processor 402 via bus 408 and stored in computer readable medium 404 as third length parameter 420. Controller 400 is configured to receive information related to a number of tacho-generator pulses per revolution of a wheel from a user or an external circuit. The information is transferred to processor 402 via bus 408 and stored in computer readable medium 404 as pulses per revolution parameter 422.

During operation, processor 402 executes a set of instructions to determine wheel diameter as described with respect to dynamic wheel diameter determination system 100 (FIG. 1) or method 300 (FIG. 3).

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system for automatic wheel diameter determination, the system comprising:
    a first proximity plate having a first length and comprising a detectable material, the first proximity plate being positioned at a first location along a direction of motion of a vehicle;
    a sensor on the vehicle configured to generate a first signal including an indication of detection of the detectable material of the first proximity plate at a start of the first length and an indication of loss of detection of the detectable material of the first proximity plate at an end of the first length;
    a signal generator on the vehicle configured to generate a second signal indicating a number of revolutions of a wheel on the vehicle; and
    a controller configured to receive the first signal and the second signal and determine a diameter of the wheel based on the first length, the indication of detection of the detectable material of the first proximity plate, the indication of loss of detection of the detectable material of the first proximity plate, and the number of revolutions of the wheel.

2. The system of claim 1, further comprising:
    a second proximity plate having a second length and comprising the detectable material, the second proximity plate being positioned at a second location along the direction of travel of the vehicle, a third length between the first proximity plate and the second proximity plate, wherein:
    the sensor is further configured to generate the first signal further including an indication of detection of the detectable material of the second proximity plate at a start of the second length and an indication of loss of detection of the detectable material of the second proximity plate at an end of the second length, and
    the controller is further configured to determine the diameter of the wheel further based on the second length, the third length, the indication of detection of the detectable material of the second proximity plate and the indication of loss of detection of the detectable material of the second proximity plate.

3. The system of claim 2, wherein the controller is further configured to determine the diameter of the wheel by averaging at least two diameter calculations from two different combinations of detection and loss of detection of the detectable material of the first proximity plate and the second proximity plate.

4. The system of claim 2, wherein the controller is further configured to determine the diameter of the wheel by averaging six diameter calculations from six different combinations of detection and loss of detection of the detectable material of the first proximity plate and the second proximity plate.

5. The system of claim 1, wherein the signal generator is a tacho-generator, the second signal comprises pulses, and a predetermined number of pulses corresponds to a single revolution of the wheel.

6. The system of claim 1, further comprising a first signaling device positioned along the direction of motion of the vehicle, the first signaling device configured to initiate a vehicle coast mode for the detection and loss of detection of the detectable material of the first proximity plate.

7. The system of claim 6, wherein the first signaling device is configured to automatically initiate the vehicle coast mode.

8. The system of claim 6, wherein the first signaling device is configured to indicate to a vehicle operator to manually initiate the vehicle coast mode.

9. The system of claim 6, further comprising a second signaling device positioned along the direction of motion of the vehicle, the second signaling device configured to initiate the determining the diameter of the wheel from the received first signal and second signal.

10. An on-board controller for a vehicle comprising:
a processor; and
a non-transitory computer readable medium connected to the processor, wherein the non-transitory computer readable medium is configured to store instructions for:
   receiving a first signal generated by a sensor on a vehicle, the first signal including an indication of detection of a detectable material of a first proximity plate at a start of a first length of the first proximity plate and an indication of loss of detection of the detectable material of the first proximity plate at an end of the first length, the first proximity plate being positioned at a first location along a direction of motion of the vehicle;
   receiving a second signal generated by a signal generator on the vehicle, the second signal indicating a number of revolutions of a wheel on the vehicle; and
   determining a diameter of the wheel based on the first length, the indication of detection of the detectable material of the first proximity plate, the indication of loss of detection of the detectable material of the first proximity plate, and the number of revolutions of the wheel.

11. The controller of claim 10, wherein:
the first signal further includes an indication of detection of the detectable material of a second proximity plate at a start of a second length of the second proximity plate and an indication of loss of detection of the detectable material of the second proximity plate at an end of the second length, the second proximity plate being positioned at a second location along the direction of motion of the vehicle, a third length between the first proximity plate and the second proximity plate; and
determining the diameter of the wheel is further based on the second length, the third length, the indication of detection of the detectable material of the second proximity plate, and the indication of loss of detection of the detectable material of the second proximity plate.

12. The controller of claim 10, wherein the non-transitory computer readable medium is further configured to store instructions for:
   receiving a third signal; and
   in response to the third signal, initiating a vehicle coast mode for the detection and loss of detection of the detectable material of the first proximity plate.

13. A method of automatically determining wheel diameter, the method comprising:
   generating, by a sensor on a vehicle, a first signal including an indication of detection of a detectable material of a first proximity plate at a start of a first length of the first proximity plate and an indication of loss of detection of the detectable material of the first proximity plate at an end of the first length, the first proximity plate being positioned at a first location along a direction of motion of the vehicle;
   generating, by a signal generator on the vehicle, a second signal indicating a number of revolutions of a wheel on the vehicle;
   receiving, by a controller, the first signal and the second signal; and
   determining, by the controller, a diameter of the wheel based on the first length, the indication of detection of the detectable material of the first proximity plate, the indication of loss of detection of the detectable material of the first proximity plate, and the number of revolutions of the wheel.

14. The method of claim 13, wherein:
the first signal further includes an indication of detection of the detectable material of a second proximity plate at a start of a second length of the second proximity plate and an indication of loss of detection of the detectable material of the second proximity plate at an end of the second length, the second proximity plate being positioned at a second location along the direction of motion of the vehicle, a third length between the first proximity plate and the second proximity plate; and
determining the diameter of the wheel is further based on the second length, the third length, the indication of detection of the detectable material of the second proximity plate, and the indication of loss of detection of the detectable material of the second proximity plate.

15. The method of claim 14, wherein determining the diameter of the wheel comprises averaging six separate diameter calculations based on detection and loss of detection events and the number of revolutions of the wheel.

16. The method of claim 13, wherein the signal generator is a tacho-generator, the second signal comprises pulses, and a predetermined number of pulses corresponds to a single revolution of the wheel.

17. The method of claim 13, further comprising initiating, by a first signaling device positioned along the direction of motion of the vehicle, a vehicle coast mode for the detection and loss of detection of the detectable material of the first proximity plate.

18. The method of claim 17, wherein initiating the vehicle coast mode comprises initiating the vehicle coast mode automatically.

19. The method of claim 17, wherein initiating the vehicle coast mode comprises initiating the vehicle coast mode manually.

20. The method of claim 17, further comprising initiating, with a second signaling device positioned along the direction of motion of the vehicle, determination of the diameter of the wheel from the received first signal and second signal.

21. A system for automatic wheel diameter determination, the system comprising:
   a sensor on a vehicle, the sensor configured to generate a first signal including:
      an indication of detection of a detectable material of a proximity plate positioned at a location along a direction of motion of the vehicle, the indication of detection corresponding to a start of a length of the proximity plate, and
      an indication of loss of detection of the detectable material of the proximity plate, the indication of loss of detection corresponding to an end of the length of the proximity plate;
   a signal generator on the vehicle configured to generate a second signal indicating a number of revolutions of a wheel on the vehicle; and
   a controller configured to receive the first signal and the second signal and determine a diameter of the wheel based on the length of the proximity plate, the indication of detection of the detectable material of the proximity plate, the indication of loss of detection of the detectable material of the proximity plate, and the number of revolutions of the wheel.

* * * * *